United States Patent [19]

Teller et al.

[11] 4,319,890
[45] Mar. 16, 1982

[54] DRY IMPACT CAPTURE OF AEROSOL PARTICULATES

[75] Inventors: Aaron J. Teller, Westboro; Denis R. J. Roy, Shrewsbury, both of Mass.

[73] Assignee: Teller Environmental Systems, Inc., Shrewsbury, Mass.

[21] Appl. No.: 192,084

[22] Filed: Sep. 29, 1980

Related U.S. Application Data

[63] Continuation of Ser. No. 892,881, Apr. 5, 1978, abandoned.

[51] Int. Cl.$^3$ .................. B01D 51/04; B01D 50/00; B03C 3/00
[52] U.S. Cl. ........................... 55/1; 55/5; 55/6; 55/107; 55/124; 55/262; 55/463; 55/DIG. 25
[58] Field of Search .............. 55/1, 5, 107, 262, 266, 55/463, 468, 474, DIG. 25, 6, 124; 239/418, 421, 433, 545

[56] References Cited

U.S. PATENT DOCUMENTS

| | | | |
|---|---|---|---|
| 570,083 | 10/1896 | Burton | 55/463 X |
| 1,221,505 | 4/1917 | Bradley et al. | 55/5 X |
| 1,239,230 | 9/1917 | Shaw | 239/545 X |
| 1,446,778 | 2/1923 | Witte | 55/5 |
| 2,428,292 | 9/1947 | Queen | 239/418 X |
| 2,604,185 | 7/1952 | Johnstone | 55/238 X |
| 2,796,237 | 6/1957 | Nettel | 55/474 X |
| 3,016,979 | 1/1962 | Schmid | 55/5 X |
| 3,101,902 | 8/1963 | Chamberlain et al. | 239/421 X |
| 3,327,455 | 6/1967 | Wertheimer | 55/463 X |
| 3,685,261 | 8/1972 | McIlvaine et al. | 261/DIG. 54 X |
| 3,834,123 | 9/1974 | Margraf | 55/DIG. 25 X |
| 3,969,482 | 7/1976 | Teller | 423/215.5 X |
| 3,995,005 | 11/1976 | Teller | 423/215.5 X |
| 4,070,162 | 1/1978 | Kober et al. | 55/262 X |
| 4,070,424 | 1/1978 | Olson et al. | 55/5 X |
| 4,073,832 | 2/1978 | McGann | 261/DIG. 54 X |
| 4,169,714 | 10/1979 | Calvert | 55/262 X |

FOREIGN PATENT DOCUMENTS

| | | | |
|---|---|---|---|
| 565810 | 11/1958 | Canada | 55/1 |
| 2153777 | 5/1973 | Fed. Rep. of Germany | 55/262 |
| 2449940 | 4/1975 | Fed. Rep. of Germany | 55/262 |
| 886802 | 10/1943 | France | 239/421 |
| 285038 | 5/1929 | United Kingdom | 55/262 |

*Primary Examiner*—Kathleen J. Prunner
*Attorney, Agent, or Firm*—Thompson, Birch, Gauthier & Samuels

[57] ABSTRACT

A dry method and apparatus for treating an effluent gas stream in order to facilitate the removal therefrom by conventional means of contaminating particulates, particularly those in the submicron range. Target particulates which are larger than the submicron contaminating particulates are dispersed in a secondary gas stream. The secondary gas stream is then introduced into the effluent gas stream. The manner of introduction is such that the contaminating particulates impact with and are captured on the larger target particulates. The target particulates and the contaminating particulates inertially impacted thereon are then separated from the combined effluent and secondary gas streams by conventional gas cleaning equipment.

5 Claims, 9 Drawing Figures

DRY IMPACT CAPTURE OF AEROSOL PARTICULATES

This is a continuation of application Ser. No. 892,881 filed Apr. 5, 1978, now abandoned.

BACKGROUND OF THE INVENTION

1. Field of the Invention

This invention relates to a dry method and apparatus for treating an effluent gas stream in order to facilitate the removal therefrom by conventional means of contaminating particulates particularly those in the submicron range.

2. Description of the Prior Art

In many countries throughout the world, emission standards have been or are being established to control the particulate content of effluent gases being exhausted to the atmosphere. Although these standards vary widely, most limit the particulate content of effluent gases to levels below 0.1 gr./sdcf. In many industrial applications, such as for example fiberglass furnaces, municipal incinerators, etc., such rigid standards can only be met by capturing and separating a large percentage of the submicron particulates suspended in the effluent gas stream.

Conventional dry cleaning devices lack the ability to effectively and reliably separate submicron contaminating particulate suspended in effluent gas steams. For example, in the case of baghouses where fabric filter bags are employed, experience has indicated that the submicron particulates have a tendendy to rapidly plug or "mask" the fabric interstices, thus requiring frequent disruptive bag shaking operations. Where cyclone dusts separators are employed, the submicron particulates have been found to lack the necessary mass required for efficient centrifugal separation.

Wet venturi scrubbers have also been employed for the purpose of separating contaminating particulates from effluent gas streams. Basically, a wet venturi scrubber consists of a constriction in the conduit carrying the contaminated effluent gas stream. The effluent gas stream is accelerated through the venturi constriction, and a liquid (usually water) is injected into the gas stream at the venturi throat. The high gas velocity atomizes the liquid and the relative velocities between the contaminating particulates and the liquid droplets result in a combination of one with the other through inertial impaction. The liquid droplet and their captured contaminating particulates are then separated from the effluent gas. While this technique can lead to higher collection efficiencies, this advantage is offset to a considerable extent by other associated problems.

For example, it is known that the efficiency of the inertial impaction technique can be improved by reducing the size of the target liquid droplets. This however requires higher gas velocities with accompanying pressure drops across the venturi of 30"-60" w.g. A pressure drop of 30" w.g. results in an excessively high energy usage of 240 kWh per million cu. ft. of gas cleaned. Attempts at reducing the pressure drop across the venturi have not been successful, primarily because a high gas velocity is essential at the venturi throat in order to achieve optimum atomization of the injected liquid and still have a remaining differential velocity between the liquid droplets and the contaminating particulates which is sufficient to produce the desired inertial impaction. Some thought has geen given to injecting a pre-atomized liquid spray into the gas stream in order to accommodate reduced gas velocities through and reduced pressure drops across the venturi, but any advantage gained in this regard has been found to be offset by the power required to pre-atomize the liquid.

Another problem with wet venturi scrubbers is that the atomized liquid droplets combine with acid components of the effluent gas stream to produce a high corrosive medium. This in turn makes it necessary to employ ducts and associated downstream equipment constructed of expensive exotic corrosion resistant materials. Even when this is done, however, corrosion related maintenance problems are encountered. Moreover, the resulting acid solutions must be neutralized, and even after this is done, disposal problems are encountered.

Other known gas cleaning arrangements have involved the injection of solid material into the effluent gas stream. An example of one such arrangement is shown in U.S. Pat. No. 2,875,844. Such arrangements have resulted in little or no capture of submicron particulates because the solids have been dumped into the effluent gas stream at the outside diameter of the conveying duct as a dense agglomerate. By the time dispersion occurs, a condition which is essential for efficient capture, the solids have attained approximately the same velocity as that of the effluent gas and the contaminating particulates suspended therein. Without an adequate relative velocity between the contaminating particulates and the dispersed target particulates, effective particulate capture through inertion impaction is an impossibility.

According to U.S. Pat. Nos. 3,969,482 and 3,995,005, solid particulate material for sorbing and/or reacting with acid gases may be dispersed in a secondary air stream and radially injected through one or more points along an effluent gas carrying conduit. However, in the absence of adequate relative velocity between the gas streams together with means for initially distributing the secondary stream into the effluent stream, little or no capture of contaminating particulates occurs, especially at conduit positions radially removed from the injection points. By the time the added material is dispersed throughout the effluent gas, the relative velocity of the streams approaches zero.

While electrostatic precipitators have met with some success, their operation has been plagued by corrosion, buildups of oils and fats where combustion practices are less than optimum, and variations in the conductivity of the contaminating particulates.

SUMMARY OF THE INVENTION

It is a general objective of the present invention to obviate or at least considerably reduce the aforementioned problems and disadvantages.

According to one aspect of the present invention, there is provided a dry method for treating an effluent gas stream in order to facilitate the removal therefrom of contaminating particulates. Target particulates are dispersed in a secondary gas stream. The secondary gas stream is then introduced into the effluent gas stream with the relative velocities of the effluent and secondary gas streams at introduction being such that contaminating particulates impact with and are captured on target particulates. To obtain distribution of the target particulates throughout the effluent gas while maintaining relative velocity, the secondary stream is introduced into the interior of the effluent stream, or from a plurality of positions about the longitudinal axis of the effluent stream, or preferably both. Preferably the second gas stream is introduced into the effluent gas stream countercurrently thereto, although it is also contemplated to effect the introduction of the secondary gas stream either transversely to or cocurrently with the effluent gas stream.

The target particulates are large enough so that after they combine with contaminating particulates, the resulting particle size and mass will be such as to permit efficient capture and separation by conventional gas cleaning equipment.

According to another aspect of the present invention, there is provided an apparatus for treating an effluent gas stream comprising a first conduit for carrying the effluent gas stream along a first flow path, and a second conduit communicating with the first conduit. Means are provided for producing a secondary gas stream in the second conduit and for injecting target particulates into the secondary gas stream at a location sufficiently removed from the outlet end of the second conduit to permit the target particulates to become dispersed by and suspended in the secondary gas stream before introduction into the effluent gas stream. The exit end of the second conduit communicates with the interior of the first conduit, or with distributor means for introducing the secondary gas stream at a plurality of positions about the longitudinal axis of the first conduit. Distributor means located within the first conduit is preferred. The distributor means is preferably arranged to introduce the secondary gas stream countercurrently into the effluent gas stream, although alternate embodiments are contemplated where the aforesaid introduction occurs transversely to or cocurrently with the effluent gas stream. It is further preferred to employ means for accelerating the effluent gas stream during introduction of the secondary gas stream, which accelerating means may comprise deflector means directing the effluent stream toward and away from the first conduit walls.

The invention will be more clearly understood from the following description and the accompanying drawings, both of which refer to preferred but nonlimiting embodiments of the invention.

BRIEF DESCRIPTION OF THE DRAWINGS

FIG. 1 is a schematic illustration of an industrial installation embodying the method and apparatus of the present invention;

FIG. 2 is an enlarged side view, partially broken away, of the preferred embodiment of the injection apparatus of the present invention;

FIG. 3 is an end view of the apparatus shown in FIG. 2;

FIG. 4 is a partially exploded view of the distributor means of the embodiment shown in FIGS. 2 and 3;

FIG. 5 is a side view, with portions broken away, of an alternate embodiment of the invention;

FIG. 6 is a sectional view taken along the line 6—6 of FIG. 5 and rotated 90°;

FIG. 7 is a side view, again with portions broken away, of a third embodiment of the invention;

FIG. 8 is an end view of the embodiment of FIG. 7; and,

FIG. 9 is a sectional view of still another embodiment of the present invention.

Referring initially to FIG. 1, there is shown an optional quench chamber 10 receiving an industrial effluent gas $S_1$ from a conventional source (not shown) such as a municipal incinerator, glass furnace, or the like. The effluent gas $S_2$ from chamber 10 is directed through first conduit 12 to conventional gas cleaning apparatus depicted at 14, which may comprise a fabric filter such as a baghouse, a cyclone separator, or the like. At section 22 of conduit 12, a secondary gas stream $A_2$ is introduced through second conduit 18 and the resulting gas mixture $S_3$ fed to cleaning apparatus 14 and exhausted to the atmosphere as a gas stream $S_4$ through stack 16 which may include a conventional exhaust blower (not shown)

The effluent gas $S_1$ has solid particulates suspended therein, for example soot, salts, oxides or the like, a portion of which are typically of submicron size. Such gas also frequently contains acid gases such as $CO_2$, $SO_x$, HCl, HF, and the like. Quench chamber 10 may be used to cool the gas by aqueous spray, or to remove a portion of the acid gases as salts by alkaline aqueous sprays as described, for example, in the two above cited patents, the disclosures of which are herein incorporated by reference. The spray water is evaporated and raises the dew point of the gas which may be of assistance in the particulate capture hereinafter described. It is not necessary in all cases, however, and may be omitted. The spray additions, if used, should be limited to avoid raising the dew point sufficiently high to provide saturation in any part of the process, particularly in apparatus 14 where excess moisture can interfere with separation. Preferably a difference of at least about 40° F. or more between dry and wet bulb temperature is maintained.

The secondary gas stream $A_2$ is produced in conduit 18 by means of blower 20 and introduced into the primary effluent gas stream $S_2$ at portion 22 of first conduit 12, between flanges 24 and 26. Target particulates P are fed through vibratory hopper 28 and feed screw 30 and injected into stream $A_2$ at a point within conduit 18 remote from conduit 12 to assure dispersal prior to introduction into the effluent stream $S_2$. Target particulates P can comprise any suitable solid and should have an average particle size of at least about 3 microns, preferably 3–50 microns, more preferably 3–20 microns, and most preferably 10–20 microns. Particulate nepheline syenite or phonolite is preferred.

FIGS. 2–9 and the following description illustrate methods and apparatus for introducing secondary gas stream $A_2$ into primary stream $S_2$ with a relative velocity and distribution sufficient to capture smaller contaminating solid aerosol particulates by inertial impact with target particulates P. The mechanism of the inelastic impact capture is not thoroughly understood but is believed to include mass attraction and mechanical effects between the roughened surfaces of the impacting solids. In some cases, electrostatic forces and humidity effects may be involved. Capture has been demonstrated by air elutriation studies in which the finer captured particulates were not separated.

The method and apparatus currently preferred are shown in FIGS. 2–4. A curved upper section 34 of second conduit 18 extends through the wall of section 22 of first conduit 12 and has a flange 32 for joining to the vertical portion of conduit 18 shown in FIG. 1. The section 22 is supported by a leg 36. The inner end of section 34 is fixed by supports 42*a*, 42*b* and 42*c* and is joined to a first right truncated cone 38 of sheet material with its larger base directed upstream with respect to the flow path of gas $S_2$. Located concentrically within and spaced from cone 38 is a second right cone 50 having its apex directed downstream with respect to the flow of $S_2$ and upstream with respect to the flow of gas $A_2$. Cones 38 and 50 define therebetween an annular passageway for the secondary gas stream $A_2$ which terminates in an annular orifice 40 through which the stream $A_2$ is introduced and injected countercurrently into effluent gas $S_2$. Together they constitute distributor means for introducing and injecting stream $A_2$ into stream $S_2$ at a plurality of positions about the axis of duct 12.

A third right cone 52 is provided with its base joined to the base of cone 50 and with its apex directed upstream with respect to the flow of gas $S_2$. Cone 52 serves both as accelerating means for the acceleration of gas stream $S_2$ during introduction of stream $A_2$, and as deflector means for deflecting the flow of $S_2$ toward the walls of conduit 12 transversely across the orifice 40.

Figure 3:
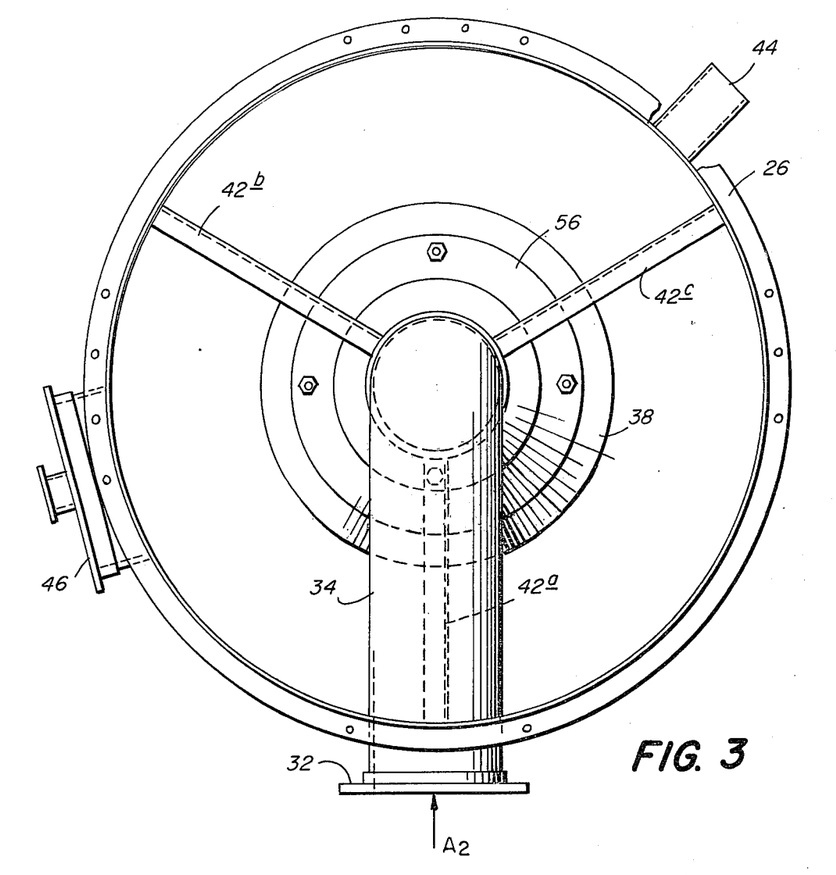

Cone 50 is secured to cone 38 by means of bolts 54 and is spaced therefrom by means of four spacer members 58. The bolts 54 engage an annular plate 56 secured to the cone 38. As shown in FIG. 3, a hinged door 46 is provided upstream of flange 24 for providing access to the interior of conduit 12. Also shown is a pipe stub 44 for connection to a fume hood (not shown) over hopper 28 to prevent escape of target particulate to the atmosphere.

Figure 2:
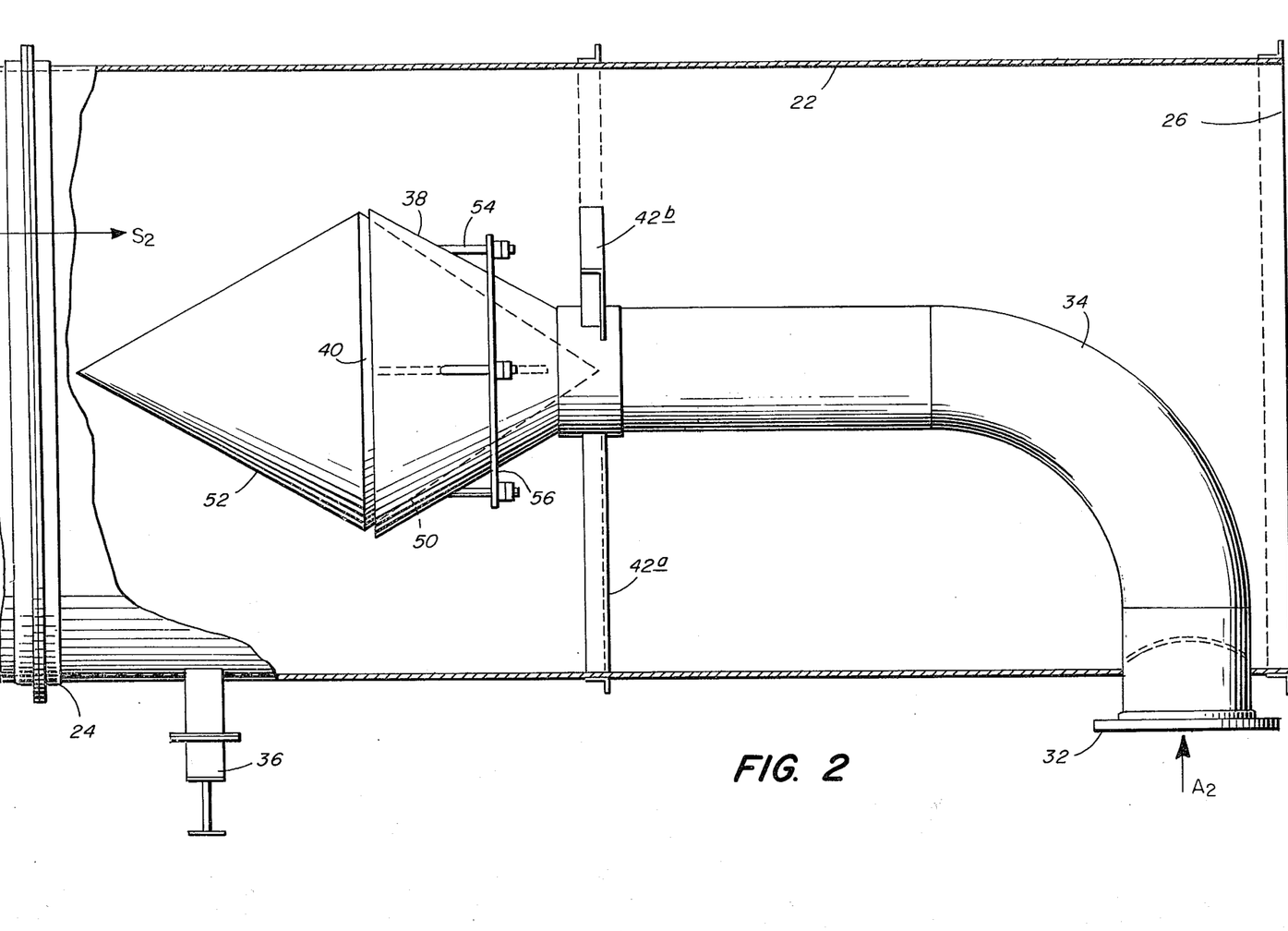
Figure 4:
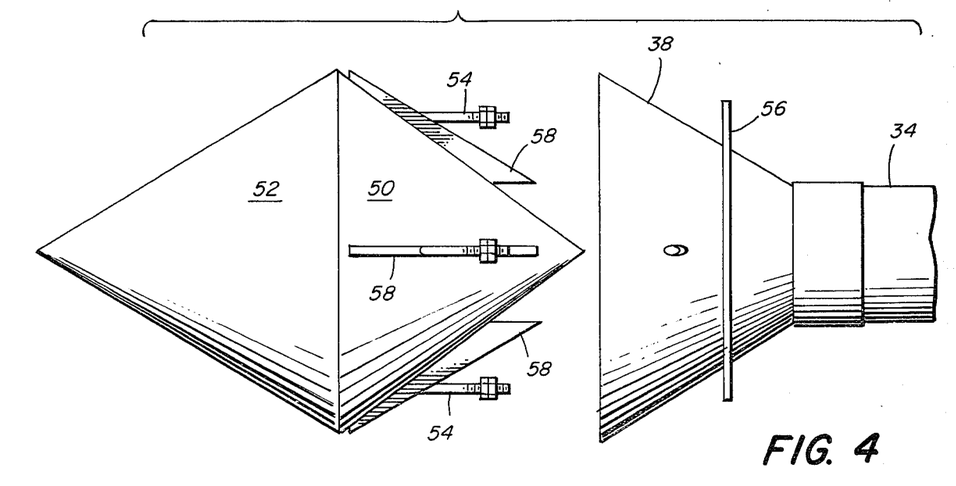

By the method and apparatus shown in FIGS. 2–4, the gas stream $A_2$ and dispersed target particulates are introduced into the interior of stream $S_2$, with good distribution and high relative velocity. Relative velocity as used herein refers to the algebraic sum of vectors of the flow of gas stream $S_2$ and $A_2$ parallel to the axis of duct 12 during introduction of $A_2$ into $S_2$. A relative velocity of about 20–200 feet per second is preferred and from about 50–150 is more preferred. By the means shown, an efficiency of capture of submicron particulates equivalent to a liquid venturi having an inlet to throat pressure drop of from 50 to 150 inches water gauge can be obtained with substantially reduced power, without contaminated wash liquid, and with reduced corrosion.

While circular sections for conduits and cones are preferred as shown, other polygonal or oval sections can be used. Preferably the same sections are used on all concentric parts to maintain uniformity of flow about the longitudinal axis of conduit section 22.

A second embodiment of the present invention is shown in FIGS. 5 and 6. A venturi is provided within conduit section 22 by means of truncated, conical member 60 fixed to its walls and having a narrowed throat opening 62. Concentric conical sheet metal members 64 and 66 are mounted between the outer wall of member 60 and the inner walls of section 22 and define between them a tapering circumferential passageway 67 which terminates in an annular orifice 68 surrounding throat opening 62. Secondary gas stream $A_2$ is fed through duct 70 tangentially into passageway 67, around member 60, and outwardly through orifice 68 where it is introduced cocurrently into the accelerated effluent gas stream $S_2$. Relative velocity is provided by feeding stream $A_2$ at a different, preferably lower, velocity than stream $S_2$. Both streams are turbulent with good distributed mixing and efficient impact capture of contaminating particulates is obtained. Duct 70 is provided with a flange 71 by which it is joined to the vertical portion of conduit 18 of FIG. 1 and comprises the outlet portion of that conduit within the conduit 12.

From FIGS. 2–4 and FIGS. 5–6, it will be noted that while the flow is countercurrent and cocurrent, respectively, there are also radial components of flow as the streams $S_2$ and $A_2$ merge. As used herein, the terms countercurrent and cocurrent include such flows where there is a substantial vector component of motion along or against the direction of flow of the primary effluent stream $S_2$ parallel to the axis of conduit 12. Cocurrent and countercurrent injection of the dispersed target particles distributed interiorly of the walls of the conduit are preferred, with countercurrent flow being most preferred since it provides the greatest effective relative velocity.

A third embodiment is shown in FIGS. 7 and 8 in which duct 82 terminates within conduit section 22 with four nozzles 86 spaced even about the longitudinal axis of section 22. Nozzles 86 are angled away from that axis toward the conduit walls and divides the secondary gas stream $A_2$ into four substreams. Duct 82 has flange 84 for joining to vertical conduit 18 and constitutes the upper outlet end thereof within conduit 12. Secondary stream $A_2$ is fed into effluent stream $S_2$ either cocurrently or countercurrently, but is preferred countercurrent as shown. Conduit section 22 is provided with access door 80 and the end of duct 82 is supported within section 22 by means of T-shaped support 88. Since the nozzles 86 and their associated structure significantly reduce the flow area within conduit section 22, gas stream $S_2$ will be accelerated as the stream $A_2$ is introduced therein.

While countercurrent or cocurrent flows are preferred, impact capture can also be obtained by radial injection from a plurality of circumferential positions as shown in the fourth embodiment of FIG. 9, although with reduced efficiency. As shown in FIG. 9, the secondary gas stream $A_2$ with dispersed target particulates P is fed through conduit 18 into a circumferential manifold 92 surrounding the wall of conduit section 22. Manifold 92 communicates with a plurality of openings 94 in the wall of section 22 which are preferably uniformly spaced therearound. Relatively high velocity for stream $A_2$ and a relatively even distribution of flow through openings 94 is required.

Referring again to FIG. 1, the gas streams $S_2$ and $A_2$ flow past flange 26 as combined stream $S_3$ and into the cleaning apparatus 14. The effluent gas $S_1$ has been cooled by admixture with the ambient gas stream $A_2$ and by any quench liquid applied in chamber 10. If further cooling is desired, an additional gas stream $A_3$, controlled by a conventional damper or the like (not shown), may be admitted through the duct 100 prior to entry into the apparatus 14.

While good results have been obtained without applying electrostatic charge to the particles P, for some applications the efficiency of removal can be increased by providing a charge of either polarity. This can be accomplished, for example by passing the gas stream $A_2$ with entrained target particulates between charge electrodes 102 and 104 within conduit 18. Alternatively, the target particulates can be triboelectrically charged by passing them in contact with a suitable triboelectric material such as glass or the like located as a lining or as one or more collars within conduit 18. A venturi collar of such material can be used for increasing friction. The contaminating particulates in stream $S_1$ need not be charged, but can be similarly charged with the opposite polarity if desired.

EXAMPLE 1

Figure 1:
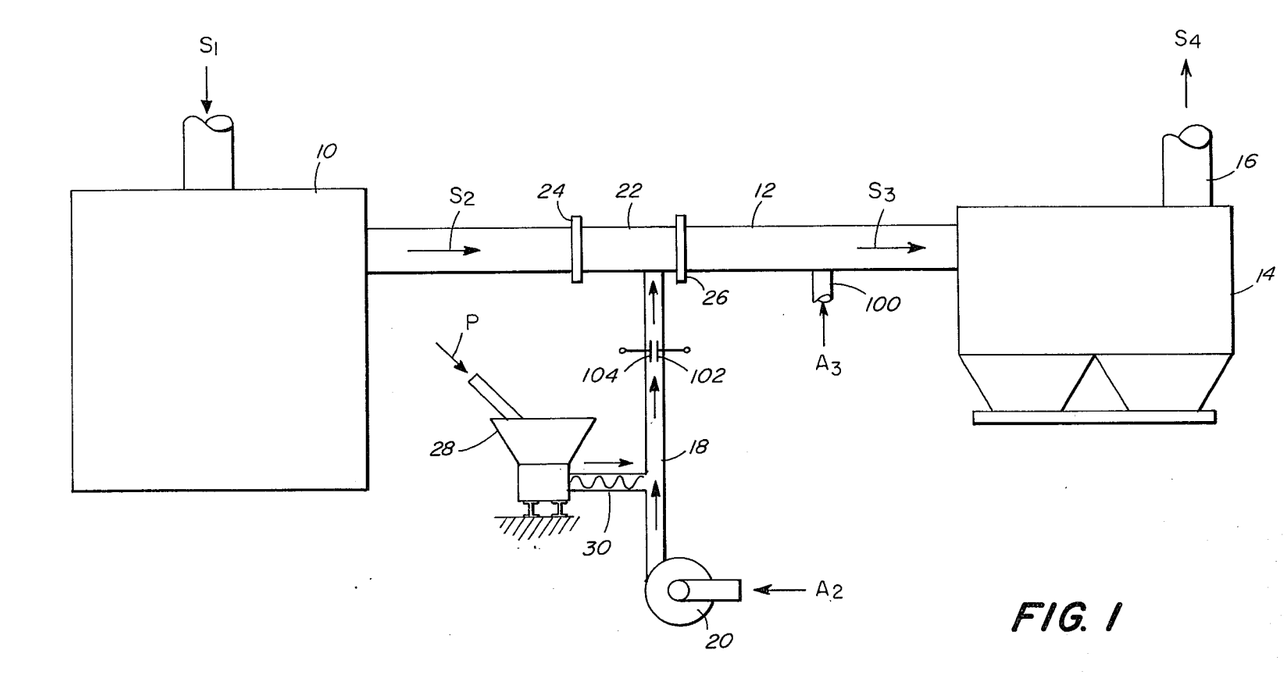
Figure 5:
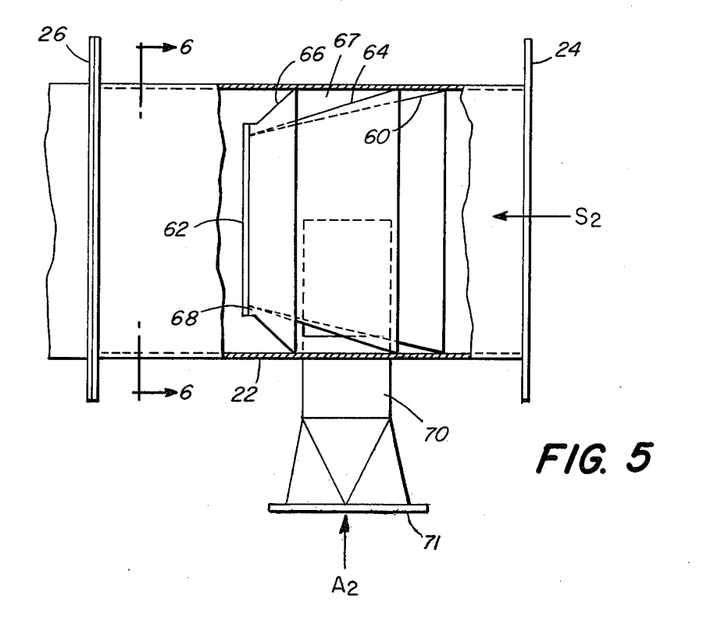
Figure 6:
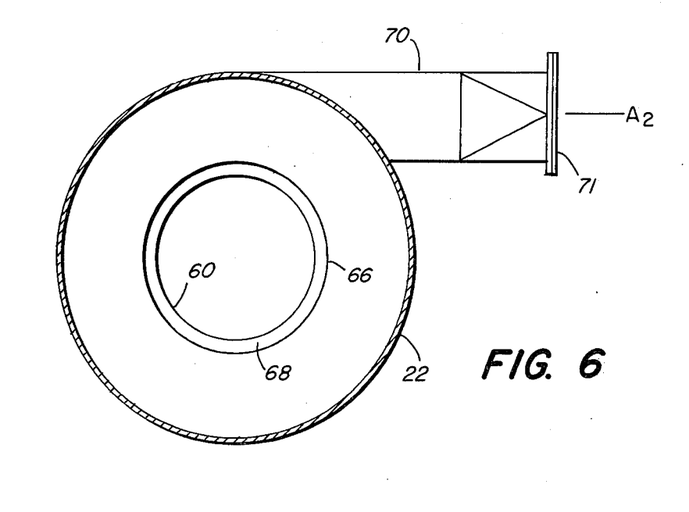
Figure 7:
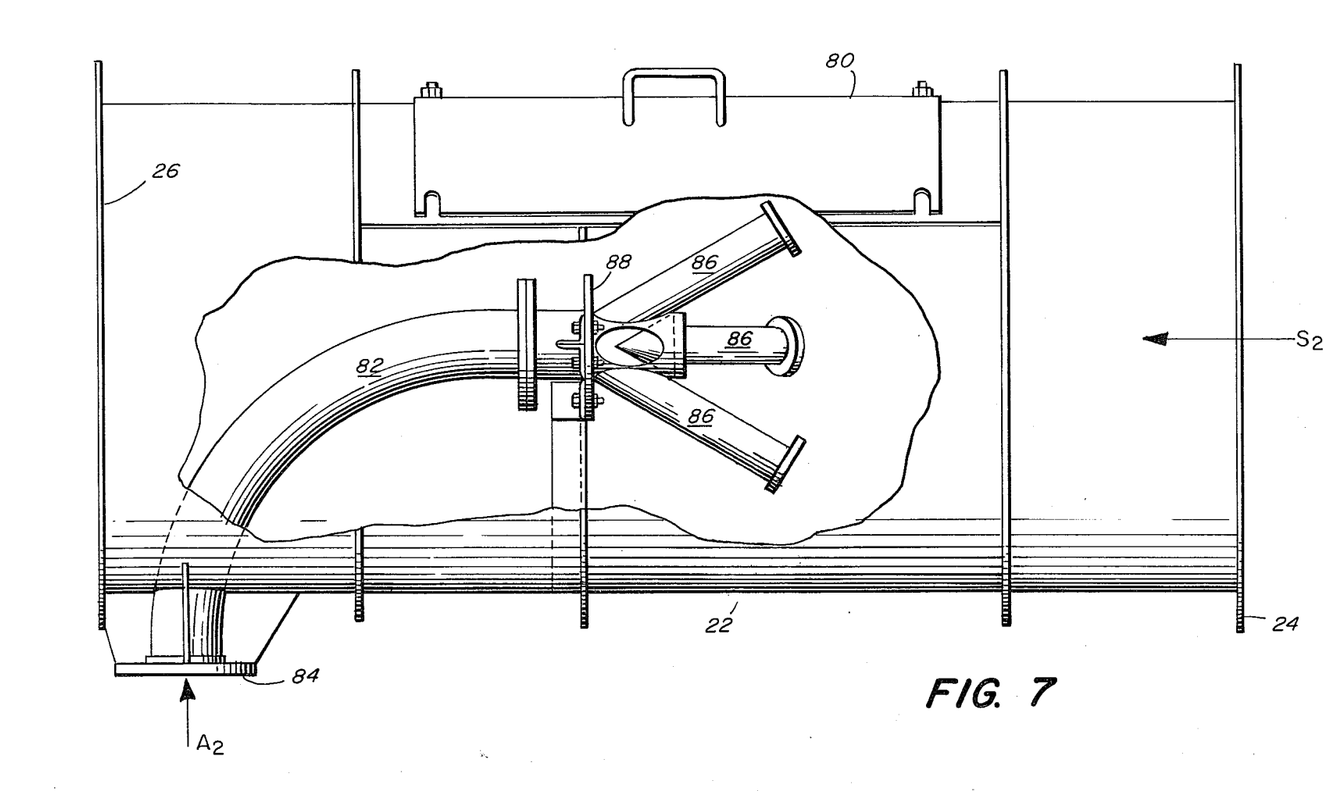
Figure 8:
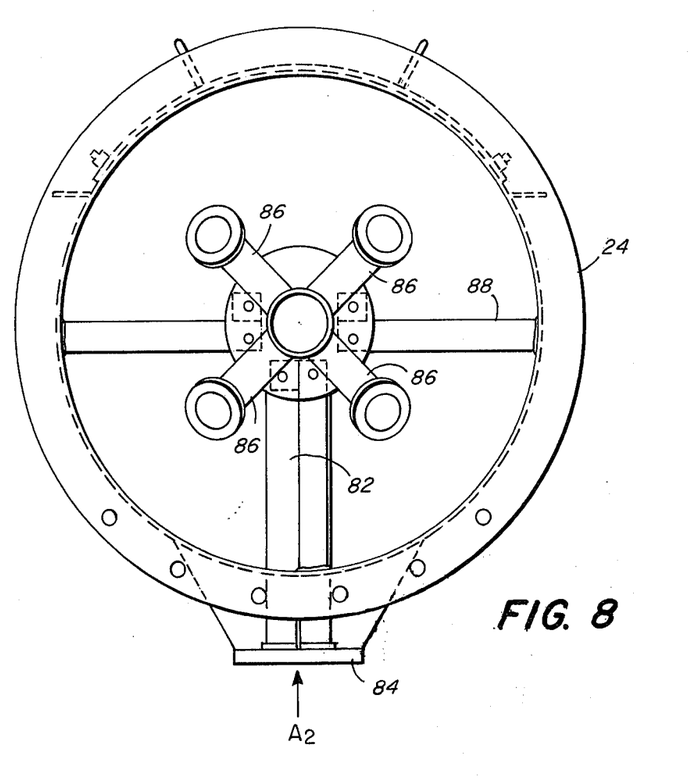
Figure 9:
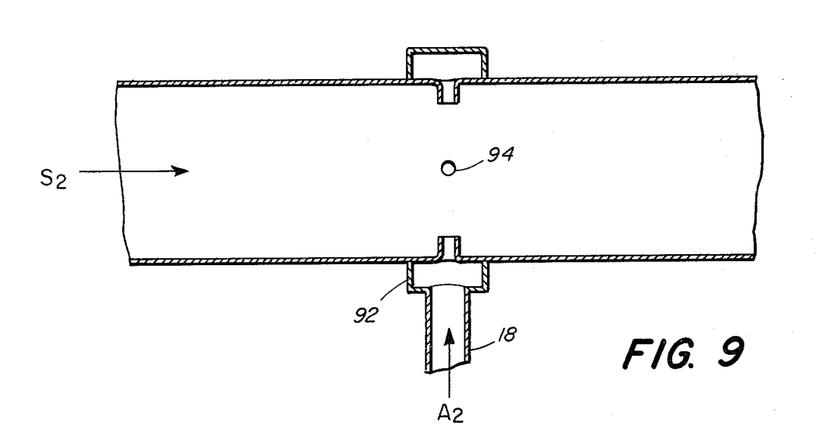

The present invention has been tested in a pilot installation using a slip stream of effluent gas from a glass melting furnace used for the manufacture of glass fibers, employing the apparatus of FIGS. 1 and 5. Ninety percent of the contaminating particulates were less than 1 micron in size and the particulates were estimated to have an average particle size of about ½ micron. These particulates were composed typically of the following salts and oxides: sodium fluoride, calcium fluoride, calcium oxides, silica, sodium sulfate and boron oxides. The gas also contained acid gas components, particularly oxides of sulfur and hydrogen fluoride as indicated in Table I below. Between about 10 and 35 pounds per hour of nepheline syenite having an average particle size between about 10 and 20 microns was metered into the secondary air stream $A_2$. The incoming gas stream $S_1$ was quenched in chamber 10 with a spray at the rate of 2.5 gallons per minute with a 2.5% by weight slurry of calcium hydroxide in water. The results of this test are given below in Table I wherein ACFM means actual cubic feet per minute, PPM means parts per million, and gr./SCF means grains per standard cubic foot.

TABLE I

|  | $S_1$ | $S_2$ | $A_2$ | $A_3$ | $S_4$ |
|---|---|---|---|---|---|
| GAS VOL. ACFM: | 7000 | 5600 | 1000 | 1400 | 7000 |
| TEMPERATURE, °F.: | | | | | |
| Dry Bulb: | 700 | 235 | Ambient | Ambient | 170 |
| Wet Bulb: | 95 | 134 | Ambient | Ambient | 117 |
| Velocity, fps: | — | 50 | 50–80* | — | — |
| SO$_x$, ppm: | 100–200 | | | | 20–30 |
| F$^-$, ppm: | 90 | | | | 1 |
| B$^-$, gr./SCF | 0.25 | | | | 0.003 |
| Other Particulates gr./SCF: | 0.2 | | | | 0.01 |

*at injection into $S_2$

Capture of the fine contaminating particulates in the effluent gas stream by the target particulates injected with the stream $A_2$ was verified by gas elutriation tests. A sample of the separated mixture of particulates shaken from the bags in the baghouse was placed in a column. A stream of air at various velocities was passed upwardly through the particulate sample. Particulates entrained with the air were separated, tested, and compared with like tests from the original material. The tests were substantially the same indicating that the fine particulates were bound to the heavier target particulates.

EXAMPLE 2

A typical flue gas from a municipal incinerator containing a mixture of solid particulates of oxides and salts and treated according to the method and apparatus of FIGS. 2–4 will give results substantially as follows, when quenched with 60 gallons per minute of water in chamber 10 and supplied with 100 to 150 pounds per hour of target particulates of 3–15 micron nepheline syenite in stream $A_2$;

TABLE II

|  | $S_1$ | $S_2$ | $A_2$ | $S_4$ |
|---|---|---|---|---|
| Gas Vol., ACFM (000's) | 250 | 150 | 5 | 156 |
| Temperature, °F. | | | | |
| Dry Bulb: | 1600 | 400 | 80 | 380 |
| Wet Bulb: | 100 | 164 | 60 | 162 |
| Velocity, fps, about: | | 50–80* | 50–80* | |
| Particulates, gr./SCF: | 2.0 | | | 0.03 |
| HCl, PPM: | 200 | | | 5 |
| HF, PPM: | 10 | | | 3 |

It should be understood that the foregoing description and examples are given for the purpose of illustration and that the invention includes all modifications and equivalents within the scope of the appended claims.

We claim:

1. In a method of treating a primary gas stream flowing in a conduit to facilitate the removal therefrom of submicron contaminating particulates, wherein a secondary gas stream with target particulates dispersed therein is introduced into the primary gas stream to promote inertial impaction between said contaminating and target particulates, the improvement comprising:

introducing said secondary gas stream countercurrently to said primary gas stream through an annular orifice circumscribing an area within said conduit; the average particle size of the target particulates being between about 3–50 microns; and deflecting said primary gas stream radially outward with reference to the longitudinal axis of the conduit and away from said area and across said orifice into an annular flow path, the flow path of the primary stream being transverse to the countercurrent flow path of the secondary gas stream at said orifice, while simultaneously accelerating said primary gas stream to achieve a relative velocity between said primary and secondary gas streams at said orifice of about 20–200 feet per second such that the target particulates penetrate the entire primary stream, the primary and secondary streams forming a combined gas stream.

2. The method of claim 1 wherein the relative velocity is greater than about 50 feet per second.

3. The method of claims 1 or 2 comprising the further step of passing the combined gas stream with suspended captured and target particulates through means for separating the particulates from the gas.

4. The method of claim 3 wherein the target particulates are nepheline syenite or phonolite.

5. The method of claim 1 wherein during introduction of the secondary gas stream into the primary gas stream, both gas streams are deflected outwardly away from their respective flow axes towards the conduit wall.

* * * * *